(12) United States Patent
Yan et al.

(10) Patent No.: US 10,853,736 B2
(45) Date of Patent: Dec. 1, 2020

(54) PREVENTING NOTIFICATION BLINDNESS

(71) Applicant: Microsoft Technology Licensing, LLC, Redmond, WA (US)

(72) Inventors: Jinyun Yan, Sunnyvale, CA (US); Peng Du, Houston, TX (US); Shaunak Chatterjee, Sunnyvale, CA (US); Shipeng Yu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 490 days.

(21) Appl. No.: 15/816,304

(22) Filed: Nov. 17, 2017

(65) Prior Publication Data

US 2019/0156230 A1    May 23, 2019

(51) Int. Cl.
| | | |
|---|---|---|
| *G06N 7/00* | (2006.01) | |
| *G06Q 50/00* | (2012.01) | |
| *G06Q 10/10* | (2012.01) | |
| *G06N 20/00* | (2019.01) | |
| *G06F 3/0481* | (2013.01) | |

(52) U.S. Cl.
CPC ......... *G06N 7/005* (2013.01); *G06F 3/04817* (2013.01); *G06N 20/00* (2019.01); *G06Q 10/1053* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2009/0305732 A1* | 12/2009 | Marcellino | ............. | H04L 67/04 455/466 |
| 2016/0170991 A1* | 6/2016 | Birchall | .................. | H04L 67/20 707/751 |
| 2018/0013844 A1* | 1/2018 | Foged | ..................... | H04L 51/24 |
| 2018/0097759 A1* | 4/2018 | Brechbuhl | ............ | G06F 16/248 |

OTHER PUBLICATIONS

Dempster et al. Maximum likelihood from incomplete data via the EM algorithm, Journal of the Royal Statistical Society. Series B (Methodological), vol. 39, No. 1, pp. 1-38. (Year: 1977).*

* cited by examiner

*Primary Examiner* — Amy M Levy
(74) *Attorney, Agent, or Firm* — Schwegman Lundberg & Woessner, P.A.

(57) ABSTRACT

A method can include determining, based on learned parameter values, an intrinsic interest and an affinity for the user to be influenced to visit the website, determining, using the learned parameter values, intrinsic interest, and affinity for the user to be influenced to visit the website, a first probability indicating a likelihood that the user will, in response to viewing a badge notification, turn off notifications or delete an app and a second probability indicating a likelihood that the user will, in response to viewing the badge notification on the app, visit a website, in response to determining the second probability is greater than a threshold larger than the first probability, causing the app to include the badge notification when displayed on the user device.

13 Claims, 7 Drawing Sheets

PREVENTING NOTIFICATION BLINDNESS

TECHNICAL FIELD

The present application relates generally to notification blindness, prediction of when notification blindness will occur, or prevention of notification blindness.

BACKGROUND

A social-networking system, such as LinkedIn, may have its success or usefulness measured at least in part by its ability to generate interest among its members (e.g., potential job candidates) in listings or postings of available jobs posted on the social networking system. An amount of interest generated among the members may depend on many factors, including, for example, the effectiveness of techniques for drawing a user to the system.

BRIEF DESCRIPTION OF THE DRAWINGS

Some embodiments of the present disclosure are illustrated, by way of example and not limitation, in the FIGS. of the accompanying drawings, in which like reference numbers indicate similar elements.

DETAILED DESCRIPTION

The present disclosure describes embodiments of systems methods, systems, apparatuses, and non-transitory machine-readable mediums for determining whether a user will be responsive to a notification badge over time. One or more embodiments can include determining whether a user will become "notification blind" (unresponsive to a notification badge) over time, or whether a user will turn off notifications or remove an app from a mobile device in response to receiving a notification badge.

Users' attention is possibly the most valuable commodity for all social networks. Gaining and retaining user attention forms a bedrock for growth in terms of both engagement and revenue. From desktop websites, to mobile apps, to push notifications, social networks have devised more invasive ways to seek a user's attention. Retaining this attention, however, depends on providing value to the users without annoying the user.

With notifications, mobile apps have the ability to buzz and badge users (see FIG. 1) to get their attention. There is a different paradigm between the websites and the app, since for the first time, an app can reach out to a user proactively, such as by using the badge notification or the buzz. At this high-stakes game, the cost of a mistake is also much higher. Notifications can be turned off because of a poor notification, and even worse an app could be deleted. Turning off notifications can be more likely than deleting the app (or un-bookmarking a website), because of a poor recommendation. Another possible outcome of a low-quality notification can include making the user "notification-blind". At the same time, good notifications can provide timely value to a user, and increase the short and long-term engagement of the user.

Consider a problem of determining whether to provide a notification badge to a user. A notification badge may increase user engagement, such as by notifying a user that there is content to be consumed using an app. However, a user can view a notification badge as annoying, such as if the content related to the notification badge is not of sufficient interest to the user, or if the notification badge itself annoys the user. A user can become blind to a notification badge if the notification badge is displayed too many times, or the content related to the notification badge is not of sufficient interest to the user. In worse situations, a user can either turn off notifications, or delete the app, such as in response to too many or a bad badge notification.

Generally, a problem includes the inability to discern directly, whether a user's actions) before/after/following a display/presentation indicate "intrinsic interest" and/or "affinity to be influenced". This is at least because user actions do not directly indicate whether a badge notification triggered the user action. But, "intrinsic interest" and "affinity to be influenced" can help determine how effective the badge notification can be in driving a user to or retaining user attention on the website. Embodiments can tie the displaying/presenting a badge notification and user actions that may or may not be related to such display/presentation.

Embodiments, herein can provide one or more technical solutions to the technical problem of determining whether to provide a user with a notification badge. The technical solution can include using a dynamic Bayesian network to make such determinations.

Figure 1:
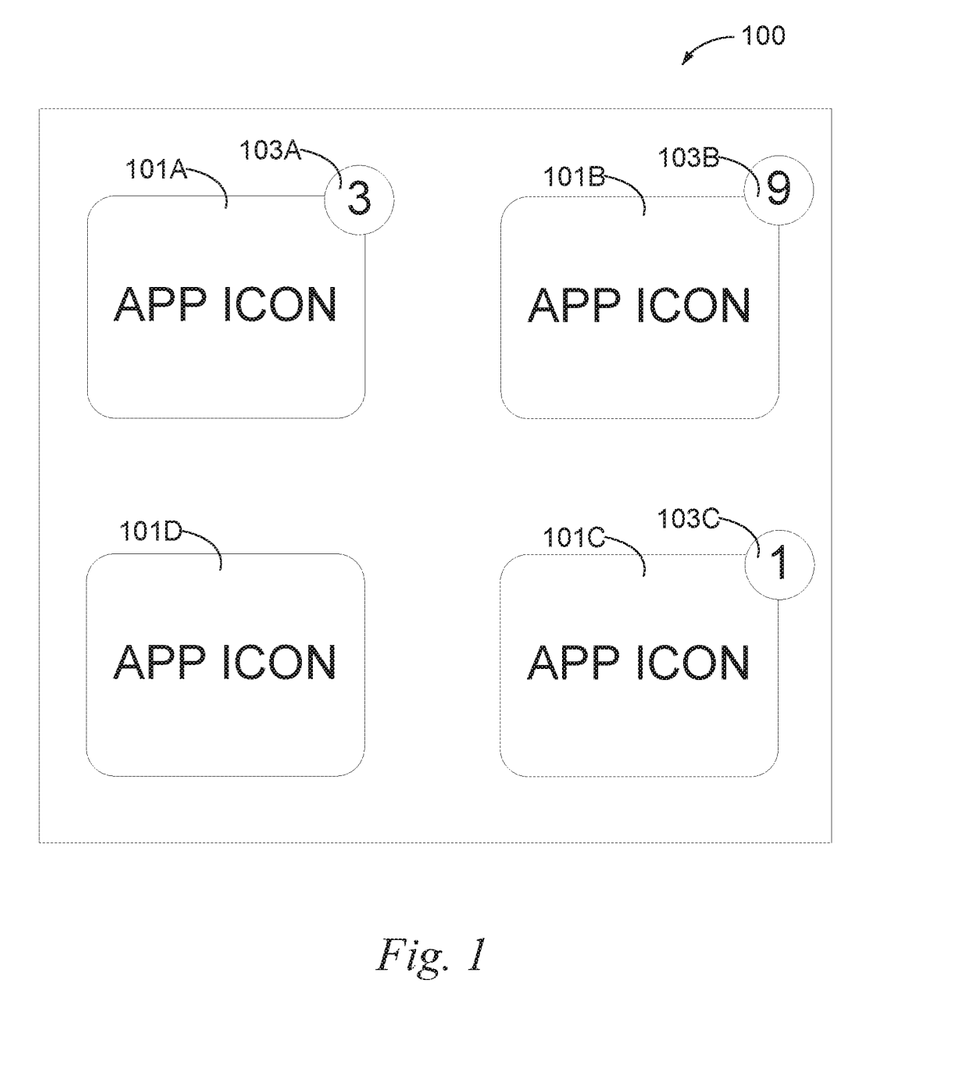
FIG. 1 is a block diagram illustrating a user interface of a mobile device, in accord with one or more embodiment.

FIG. 1 illustrates, by way of example, a block diagram of an embodiment of a user interface 100 of a mobile device. The user interface 100 as illustrated includes a plurality of app icons 101A, 101B, 101C, and 101D. The app icons 101A-101C include corresponding badge notifications 103A, 103B, and 103C. The app icon 101A-101D can be selected by a user, such as by touching, tapping, or otherwise selecting the app icon 101A-101D. An app associated with the app icon 101A-101D can be executed in response to the touching or tapping. In one or more embodiments, an app can include a social networking app, such as can include Facebook, from Facebook, Inc. of Menlo Park, Calif., U.S.A., Google Plus, from Google, Inc. of Mountain View, Calif., U.S.A., LinkedIn, from LinkedIn Corporation of Sunnyvale, Calif., U.S.A., Instagram, from Facebook, Inc. of Menlo Park, Calif., among others. In one or more embodiments, an app can include a financial app, such as from a bank or other financial institution, a maps app, a music app, weather app, email app, voice over internet protocol (VOW) app, sports app, news app, or other app.

The badge notification 103A-103C indicates to a user that there is some subject matter or content to attend to using the corresponding app associated with the app icon 101A-101C. The badge notification 103A-103C is displayed to get a user's attention. The badge notification 103A-103C can indicate a variety of different things. For example, a badge notification can indicate that a user has a new message, a user they have followed on a social networking site has made a post, another user has commented or liked a post, followed the user on a social networking site, the app has an update available, updated maps are available for a map app, money has been transferred to/from the user's financial account, a notable news event has occurred, or the like.

The badge notification 103A-103C is controlled by the app corresponding to the respective app icon 101A-101C. The badge notification 103A-103C can be associated with content of varying degrees of importance or interest to a user.

Consider a situation in which the badge notification 103C regards content that irritates the user. The user can act on the badge notification 103C by selecting the app icon 1010 and viewing the content associated with the badge notification 103C. The user can be irritated by the content associated with the badge notification 103C and can disregard future occurrences of the badge notification 103C, turn off notifications from the app, or even delete the app.

Consider another situation in which the badge notification 103A is present on the app icon 101A most of the time. Nearly every time the user views the app icon 101A the notification badge 103A is present. The notification badge 103A can gain less of the user's attention than if the notification badge 103A were presented less often.

Either of the situations presented can result in a user disabling notifications, selecting the app icon 101A-101C less often, or even worse, deleting the app associated with the badge notification 103A-103C. Embodiments provide predictive tools to determine how a user will respond to the badge notification 103A-103C. Embodiments can determine a probability that the user will respond adversely, such as by turning off notifications, deleting the app, or otherwise spending less time using the app. In one or more embodiments, if the probability is greater than a threshold probability, the app can refrain from providing the badge notification 103A-103C. In one or more other embodiments, if a difference between the probability a user will respond adversely and a probability a user will respond positively can be compared to a threshold. If the probability of a positive response is greater than the probability of an adverse response and the difference between them is greater than a threshold value, the badge notification can be provided.

In other embodiments, a dynamic Bayesian network (DBN) can model and predict how a user will respond to notifications in a longer term, such as weeks, months, years, or the like. The DBN for a given user can be run for a variety of different levels of short and long-term badge notifications. User-engagement can be predicted for each of the different levels and short and long-term notifications. A specific number of short and long-term badge notifications predicted to maximize user engagement can be stored and used as a number of notifications to be presented to the user. For example, a first user may respond better to more sparse badge notifications and a second user may respond better to more badge notifications, more often. The first user may be presented with a first number of badge notifications a first day, a second, lower number of badge notifications a second day, and a third, higher number of badge notifications a third day. The second user may be presented with more badge notifications than the first user on each of the first, second, and third days.

While embodiments are phrased in terms of determining whether a badge notification will result in reduced app usage, the embodiments could equally be phrased in terms of determining whether a badge notification will result in increased app usage.

It is understood that various embodiments described herein include encoded instructions that comprise operations to determine a probability or make a decision as to whether provide a badge notification on a user interface of a user device. The badge notification can be displayed to be representative of items on a website that the user can find of interest. In addition, the badge notification can be generated by a notification blindness engine, such as for display on a computing device, a server computing device, a mobile computing device, etc.

It is understood that a machine learning data model is represented according to one more encoded instructions that, when executed, perform calculations that result in inferences, predictions, conclusions, or estimations based in part on the training data. In one example, the machine learning data model can include an EM technique.

Figure 2:
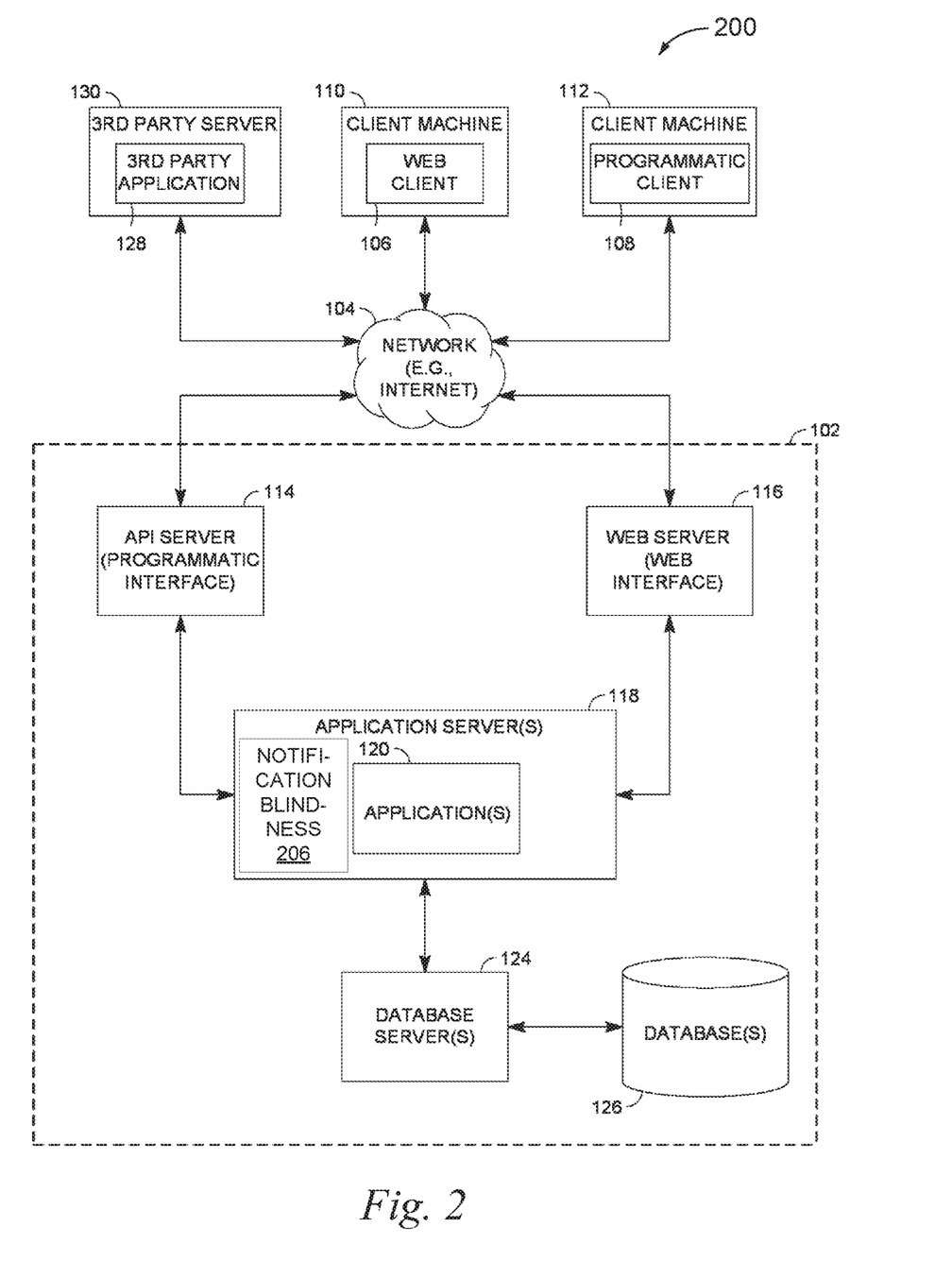
FIG. 2 is a block diagram illustrating a client-server system, in accordance with an example embodiment.

FIG. 2 is a block diagram illustrating a client-server system 200, in accordance with an example embodiment. A networked system 102 provides server-side functionality via a network 104 (e.g., the Internet or Wide Area Network (WAN)) to one or more clients. FIG. 2 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 2 to form part of the networked system 102, in alternative embodiments, the applications 120 may form part of a service that is separate and distinct from the networked system 102.

Further, while the system 200 shown in FIG. 2 employs a client-server architecture, the present disclosure is not limited to such an architecture, and could be used in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 2 also illustrates a third-party application 128, executing on a third-party server machine 130. The third-party server machine may have programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more functions that are supported by the relevant applications of the networked system 102. In some embodiments, the networked system 102 may comprise functional components of a professional social network.

The application servers 118 as illustrated host notification blindness engine 206. The notification blindness engine 206 determines whether to present a badge notification to a user. The notification blindness engine 206 can consider whether presenting the badge notification 103A-103C will reduce a probability the user will spend less time using the app (or increase a probability the user will spend more time using the app). In making the determination of whether to present the badge notification 103A-103C, the notification blindness engine 206 can consider a relevance of content associated with the notification badge 103A-103C, a history of the user's interactions with content, a history of the user's interactions with other users, or the like. The notification blindness engine 206 can consider a history of other user's reactions to the badge notification 103A-103C in determining whether to provide the badge notification 103A-103C. The other users can include other users with one or more similar attributes (discussed elsewhere herein). The notification blindness engine 206 can implement a dynamic Bayesian network, or the like, in determining whether to provide the badge notification 103A-103C.

Figure 3:
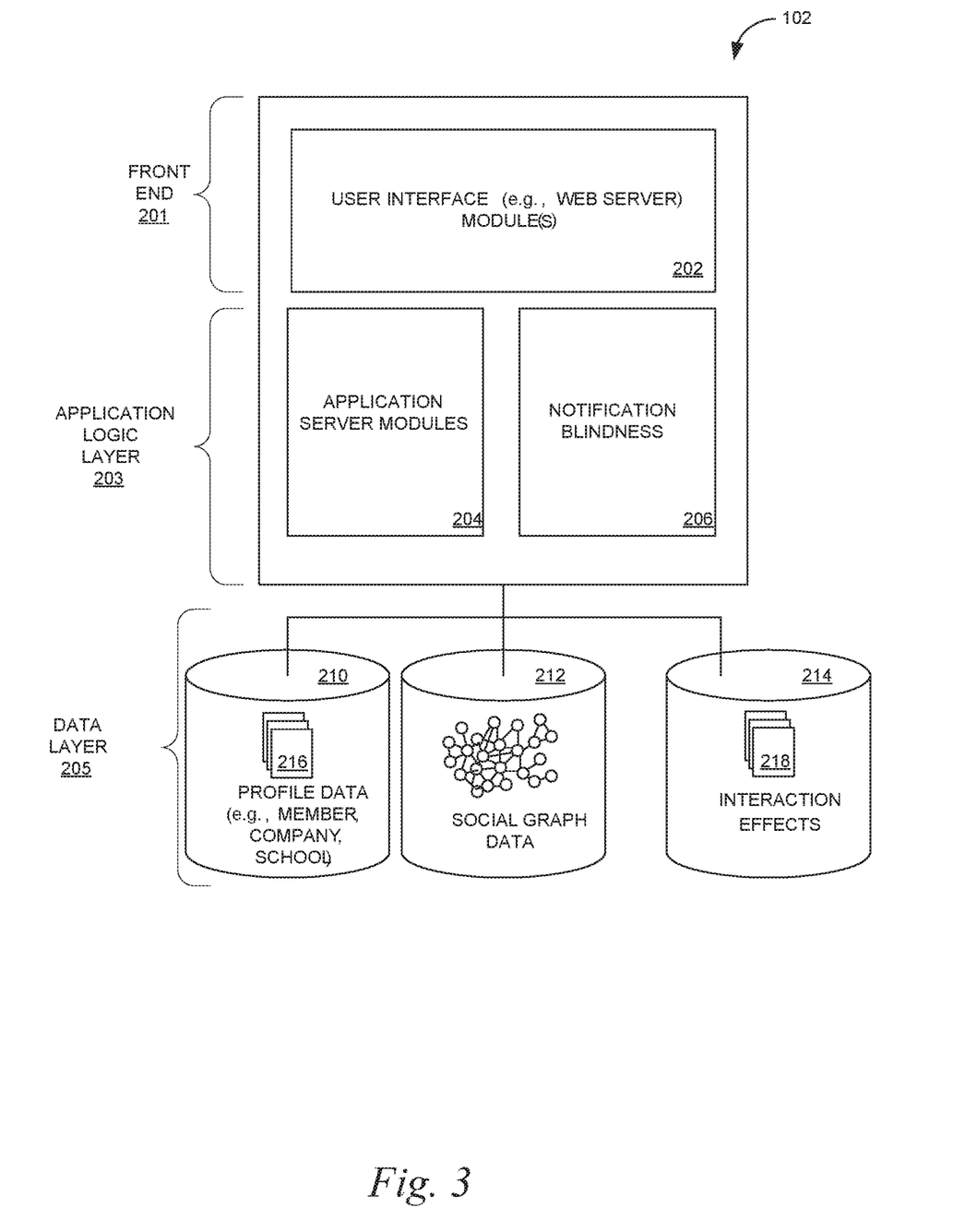
FIG. 3 is a block diagram showing the functional components of a social networking service within a networked system, in accordance with an example embodiment.

FIG. 3 is a block diagram showing functional components of a professional social network within the networked system 102; in accordance with an example embodiment. As shown in FIG. 3, the professional social network may include a three-tiered architecture, consisting of a front-end layer 201, an application logic layer 203, and a data layer 205. In some embodiments, the modules, systems, and/or engines shown in FIG. 3 represent a set of executable software instructions and the corresponding hardware (e.g., memory and processing circuitry (e.g., a processor, field programmable gate array (FPGA), and/or components configured to execute instructions and perform operations dictated by the instructions, such as can include a transistor, resistor, inductor, capacitor, regulator, power source, multiplexer, amplifier, switch, buffer, diode, or the like) for executing the instructions. One skilled in the art recognizes that various additional functional modules or engines may be used with a professional social network, such as that illustrated in FIG. 3, to facilitate additional functionality that is not specifically described herein. The various functional modules and engines depicted in FIG. 3 may reside on a single server computer, or may be distributed across several server computers in various arrangements. Moreover, although a professional social network is depicted in FIG. 3 as a three-tiered architecture, embodiments are not limited to such architecture. Other architectures are within the scope of the present disclosure.

As shown in FIG. 3, in some embodiments, the front-end layer 201 comprises a user interface module (e.g., a web server) 202, which receives requests and inputs from various client-computing devices (e.g., client machine 110 or 112, or $3^{rd}$ party server 130), and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, or to publish messages or status updates on behalf of an organization, may be services implemented in independent application server modules 204. Similarly, a variety of other applications or services that are made available to members of the social network service may be embodied in their own application server modules 204.

As shown in FIG. 3, the data layer 205 may include several databases, such as a database 210 for storing profile data 216, including both member profile attribute data as well as profile attribute data for various organizations. In some embodiments, when a person initially registers to become a member of the professional social network, the person is prompted to provide some profile attribute data, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network, the representative may be prompted to provide certain information about the organization. This information may be stored, for example, in the database 210, or another database (not shown). In some embodiments, the profile data 216 may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or a seniority level within a company. In some embodiments, importing or otherwise accessing data from one or more externally hosted data sources may enhance profile data 216 for both members and organizations. For instance, with companies, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

After a user is registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. The various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module through which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. Some third-party applications may reside and execute on one or more mobile devices (e.g., a smartphone, or tablet computing devices) having a mobile operating system, such as the client machine 110 or 112.

The data in the data layer 205 may be accessed, used, and adjusted by the notification blindness engine 206 as will be described in more detail below in conjunction with FIGS. 3-7. Although the notification blindness engine 206 is referred to herein as being used in the context of a professional social network, it is contemplated that it may also be employed in the context of any website or online services, including, but not limited to, content sharing sites (e.g., photo- or video-sharing sites, text-sharing sites, financial management sites, retail sites, or the like) and any other apps that try to gain and retain a user's attention. Although features of the present disclosure are referred to herein as being used or presented in the context of an app, it is contemplated that any user interface view (e.g., a user interface on a mobile device or on desktop software) is within the scope of the present disclosure.

In one or more embodiments, the data layer 205 further includes a database 214 that includes interaction effects 218 based on social network activity of one or more member accounts. The interaction effects 218 can include data indicating cause and effect. For example, an effect can include a user turning off notifications, deleting the app, increasing daily activity on the site, or the like. For example, a cause can include providing a user X number of badge notifications in the short-term, providing Y number of badge notifications in the long-term, or a combination thereof.

Figure 4:
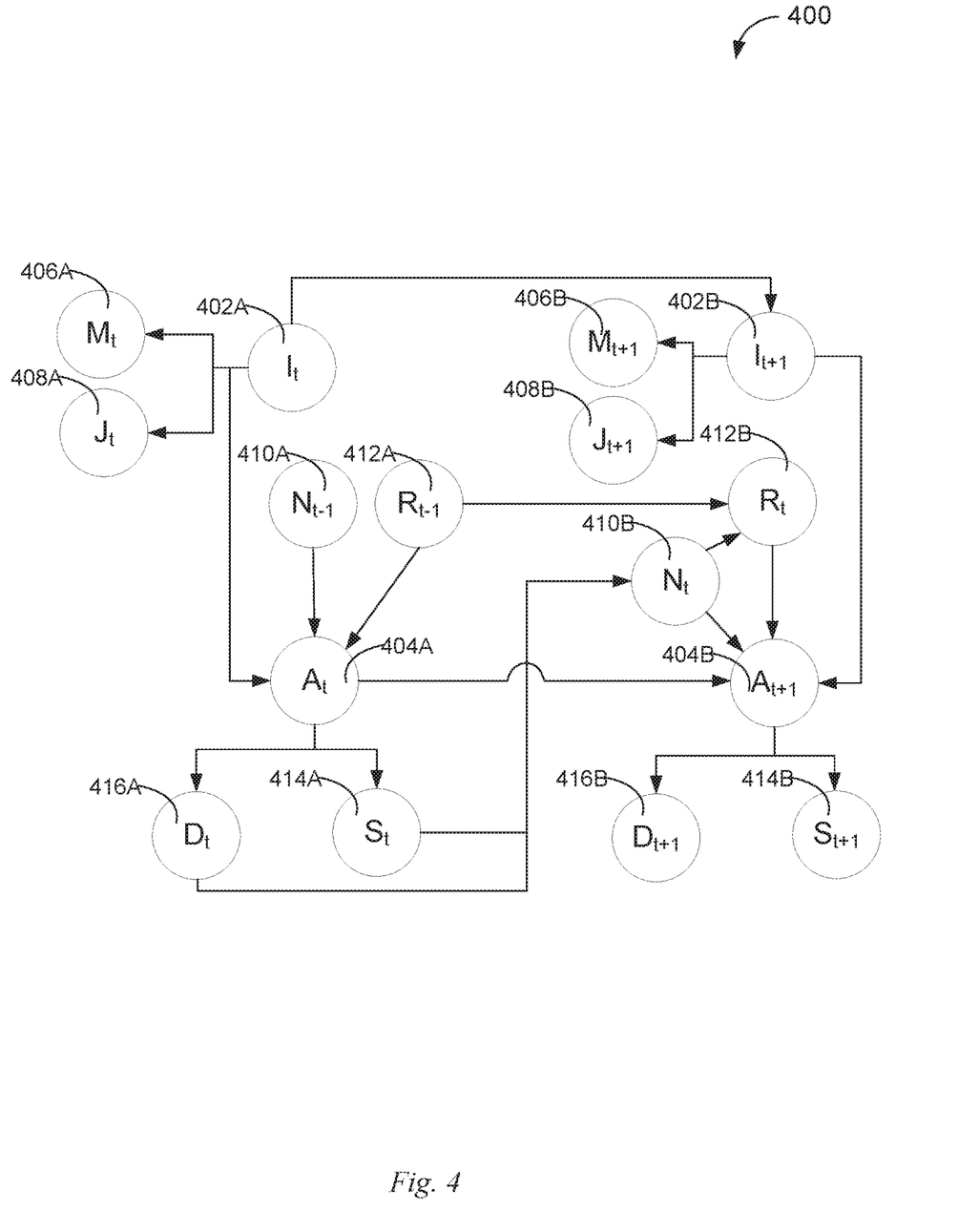
FIG. 4 is a transition diagram illustrating relations between states of a dynamic Bayesian network model, in accord with one or more embodiments.

FIG. 4 illustrates, by way of example, a diagram of an embodiment of a graphical diagram 400 detailing transitions between nodes of a dynamic Bayesian network. The graphical diagram includes eight nodes, two of which are hidden and to be estimated by the notification blindness engine 206. The other six nodes are user-specific action nodes, such as can be determined by the notification blindness engine 206 using data from the data layer 205, such as interaction effects 218, profile data 216, or social graph data from the database 212.

A dynamic Bayesian network (DBN) can be represented by a directed acyclic graph of nodes with links connecting the nodes. Each node represents a variable, whether continuous or discrete. A link between nodes indicates that one node directly influences another.

Variables are represented using capital letters (X, Y). A specific value for a variable is represented using lower-case (x, y). A specific value for the variable X is represented by x. A number of possible states for a discrete variable, Y, is represented as |Y|. Prob(X) represents the probability of X occurring. Each node is assigned a probability distribution. For a node with no parents, the distribution is P(X), for a node with one or more parents the distribution is P(X|parent (X)) (i.e. the probability that X will occur given its parent nodes. A subscript of "t" represents a current time frame, a subscript of "t−1" represents a most recent past time frame, and a subscript of "t+1" represents an immediately next time frame. Thus, $S_{t+1}$ represents a user's predicted engagement level in an immediately next time frame.

There are a variety of methods of determining the distributions. They can be learned from data, specified by a user, or a combination thereof. Evidence is a state of a variable that is known. For example, a user's prior engagement level is known. The dynamic Bayesian network can be used to infer whether providing a badge notification will help or harm a user's perception of the website. Thus, the dynamic Bayesian network can help increase and gain user retention through providing a badge notification or refraining from providing a badge notification.

The hidden nodes include an intrinsic intent node 402A and an affinity node 404A. The intrinsic intent node 402A is for a current time and an intrinsic intent node 402B is for a future time. Similarly, the affinity node 404A is for a current time and an affinity node 404B is for a future time. The intrinsic intent node 402A-402B accounts for a user's natural, uninfluenced propensity for using the app or otherwise visiting the social networking site. The affinity node 404A-404B accounts for influences in gaining a user visit to the website.

A user's action on a website, whether positive or negative, can depend on an influenced action affinity and intrinsic interest. The influenced action affinity can depend on intrinsic interest, a user's historical actions on a site, and external stimuli, such as notifications on both and short-term and long-term timeframe. Further, a user's intrinsic interest and influenced interest in a website can be estimated based on a user's history of actions, interactions, and express or implied interests on the website.

This is captured in the dynamic Bayesian network by including hidden node dependencies. The intrinsic interest node 402A-402B influences a member activeness level node 406A and 406B and a job seeker level node 408A and 408B. The intrinsic interest node 402A-402B can be determined based on the member activeness level node 406A-406B, the job seeker level node 408A-408B, or a previous intrinsic interest node (e.g., intrinsic interest node 402B is dependent on prior intrinsic interest node 402A). Members who show high intrinsic interest, will be more active on the site or app, and exhibit higher level of job seeking intent; vice versa. While a job seeking intent is a signal captured by the nature of LinkedIn® as a professional social network, this can be generalized as other onsite activities for other social networks or apps.

The variable, I, of the intrinsic interest node 402B can take on a plurality of values representing different levels of user intrinsic interest. For example, a variable of the intrinsic interest node 402A-402B with a value of zero can represent little or no intrinsic interest in visiting a website, a value of one can represent about average intrinsic interest in visiting a website, and a value of two can represent higher than average intrinsic interest in visiting a website. The intrinsic interest informs the activeness level node and the job seeker level node. For example, consider a user that includes a high intrinsic interest, that user can be very active (as indicated by the member activeness level node 406A-406B) and an active job seeker (as indicated by the job seeker level node 408A-408B) the user can have a higher than average intrinsic interest in using a professional networking website, such as LinkedIn. In another example, consider a user that has a low intrinsic interest, that user can refrain from visiting the website for a month, and be a non-active job seeker, that user can have a lower than average intrinsic interest in using the professional networking website. In yet another example, consider a user that is active on a website weekly, and is a non-active job seeker, that user can have an average intrinsic interest in using the professional networking website. A variable of the intrinsic interest node 402A-402B can reflect these different levels of intrinsic interest.

A value of a variable, M, of the member activeness level node 406A-406B can be determined using data from the data layer 205. The value of M can indicate whether the user is dormant (inactive), active daily, active weekly, or active monthly on the website. This data can be stored in and retrieved from the interactions database 214 as part of the interaction effects 218. For example, in response to a user logging in to the website, a member identification of a user may be stored along with a date or timestamp of access and an indication that the user logged into the website. A number of logged entries within a specified time range can be summed and converted to a value of the variable, M.

A value of a variable, J, of the job seeker level node 408A-408B can be determined using data from the data layer 205. The value of J can indicate whether the user is an active job seeker or that the user is not currently seeking a job. This data can be stored in, retrieved from, or inferred using data from the profile database 210 or interaction database 214. For example, a user's profile can indicate whether the user is currently employed, a user's actions along with profile information can indicate whether the user is currently employed but "actively seeking new job opportunities", or whether a member is about to graduate and "currently on the job market". User's actions can include member activity on job postings and company pages, and member's interaction with in-mail and messages, such as from a recruiter. At least some of these data can be gathered to infer a user's job-seeker status. In another example, the interaction database 214 can include data regarding a user discussing job opportunities with other users. In yet another example, the profile database can include data indicating a date/time a user last updated their profile. A user who is currently employed is less likely to be a job seeker than a user who is currently unemployed. A user who has updated their profile more recently is more likely to be a job seeker than a user who has not updated their profile recently. A user who has responded affirmatively to a recruiter's message regarding a job opening is more likely to be a job seeker than a user who ignores such messages. The value of J can reflect how actively a user is seeking a job.

The affinity level node 404A-404B can be affected by the user's intrinsic interest node 402A-402B, a short-term notification level node 410A and 410B, or a long-term notification level node 412A and 412B. The affinity level node 404A-404B can affect a user engagement level node 414A and 414B and a disables notifications node 416A and 416B.

A value of a variable, A, of the affinity level node 404A-404B, indicates an influenced level of affinity that leads to either positive or negative action. For example, A being a relatively low value (e.g., zero or near zero) can indicate a likely chance of negative action (turn off or disable notifications) or implicitly negative action (e.g., blind to notifications, such that no increase in sessions is seen due to badge notifications), A being set to a maximum value can indicate a user is highly likely to perform a positive action (e.g., increase number of sessions on website, such as through an app), and A being set to a number between zero and the maximum number can represent an intermediate influence level.

A variable, N, of the short-term notification level node 410A-410B can include respective values indicating a number of badge notifications the user has been exposed to in the short term (e.g., last day or week). For example, N being set to a value of zero can indicate the user has not been exposed to any badge notifications in the short term, N being set to a maximum value indicates that the user has been exposed to more than a specified maximum number of badge notifications, and N being set to a value between the maximum number and zero indicates an intermediate exposure level to badge notifications.

A variable, R, of the long-term notification level node 412A-412B can include respective values indicating a number of badge notifications the user has been exposed to in the longer term (e.g., between the short term and a maximum term (e.g., week, month, year, or the like)). For example, if a user has been exposed to badge notifications more than a maximum threshold percentage (e.g., 70%, 75%, 80%, etc., or a percentage therebetween) over the long-term R can be set to a maximum level. If a user has been exposed to less than a minimum percentage of badge notifications (e.g., 0%, 5%, 10%, 15%, 20%, 25%, or a percentage therebetween) over the long-term, R can be set to a minimum level. A user exposed to notifications, in the long term, a percentage of time between the maximum and the minimum threshold percentages, R can be set to an intermediate value, in one or more embodiments.

A variable, S, of the user engagement level node 414A-414B quantifies a number of times the user accesses the website in a day. The variable, S, of the user engagement level node 414A-414B can include respective values indicating different ranges of website access. For example, S set to a first value can indicate no user-engagement (e.g., no website accesses), S set to a second value can indicate a light user-engagement level (e.g., a few accesses in an average day), S set to a third value can indicate a moderate user-engagement level (e.g., between three and five access in an average day), S set to a fourth value can indicate a heavy user-engagement level (e.g., between six and ten website accesses in an average day), and S set to a fifth value can indicate an addictive user-engagement level (e.g., greater than ten website accesses in an average day). The numbers provided are merely examples and other numbers and numbers of levels can be used in other embodiments.

A variable, D, of the disable notifications node 416A-416B quantifies a ratio of notification types that are disabled at time, t. In one or more embodiments, D can be binary, such as to include a first value that indicates the user has a propensity to disable notifications (or a specified percentage of notifications) or delete the app, and a second value indicates the user does not have the propensity to disable the notifications or delete the app.

The dynamic Bayesian network models a user's future behaviour in the context of notifications and engagement. A dynamic Bayesian network is intuitively interpretable. It is relatively easy to encode prior knowledge about the dependency structure into the dynamic Bayesian network. In the dynamic Bayesian network of FIG. 4, two primary hidden states are learned at time t: the intrinsic interest of visiting the site (It) and the influenced interest of taking certain actions (At). A user's actions positively (lead to sessions) and negatively (turn off notifications), depending on the influenced action affinity, A, which in turn depends on external stimulus (notifications both short-term and long-term) and intrinsic interest. The intrinsic internal interest can impact user's monthly activeness and job seeking activities.

In one or more embodiments, an Expectation-Maximization (EM) technique can be used to learn the model parameters. EM is an iterative machine-learning and data mining technique in which a model depends on latent variables (e.g., the internal intrinsic interest or influenced affinity interest in the example of the dynamic Bayesian network of FIG. 4). The dynamic Bayesian network can learn the evolving interest through sequential observations, and predict future variable values given past observations using EM.

The EM technique can include determining past actions of users with similar profiles. For example, consider a user with five years as a software engineer, age 30-35, a college education, and determined to be actively looking for a job. The parameters of the dynamic Bayesian network for the software engineer can be determined based on other users with three to five years of experience as a software or computer engineer, aged 30-35, and actively looking for a job. These users can be determined by mining the profile data 216.

The interaction effects data 218 can include data of past behaviours performed by a user and data regarding circumstances surrounding the past behaviours. For example, the interaction effects data 218 can include data indicating that the user has disabled notifications or deleted the app. The circumstances surrounding this behaviour can include data regarding a number of short and long-term badge notifications, a user activity level, or the like. This data can be mined and aggregated to determine the parameters of the dynamic Bayesian network.

Consider the software engineer previously discussed. The intrinsic interest variable, I, and the affinity interest variable, A, for the dynamic Bayesian network representing the software engineer's response to the badge notification can be determined based on dynamic Bayesian networks or interaction effects data 218 of similar software engineers. For example, if data indicates that badge notifications, when provided two or three times a day, maximizes retention gain or interaction from software engineers and has low probability of adverse effects (e.g., disabling notifications or deleting the app), the dynamic Bayesian network can infer this from the data and indicate that it is as good strategy to send the badge notifications to the software engineer two to three times a day.

Figure 5:
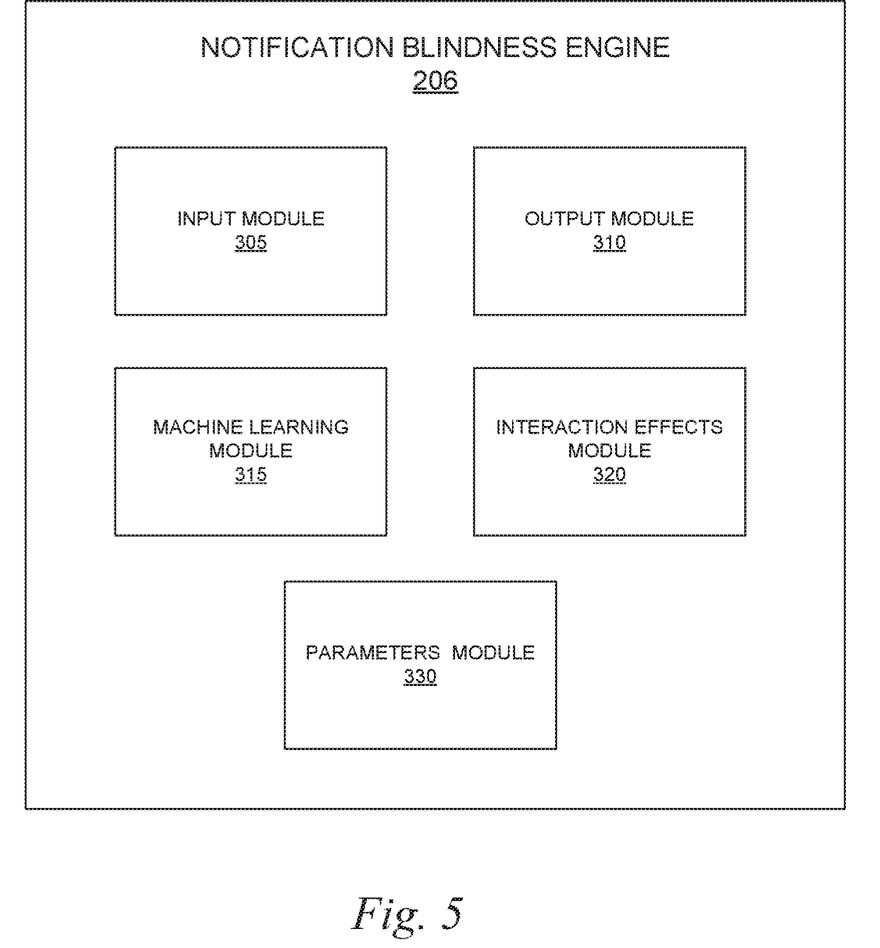
FIG. 5 is a block diagram illustrating components of a notification blindness engine, in accord with one or more embodiments.

FIG. 5 is a block diagram showing example components of the notification blindness engine 206, according to some embodiments. The input module 305 is a hardware-implemented module that controls, manages and stores information related to any inputs from one or more components of system 102 as illustrated in FIG. 3 and FIG. 3. In various embodiments, the inputs include a plurality of content items, a target member account, training data, one or more historical interaction effects, or the like.

The output module 310 is a hardware-implemented module that controls, manages and stores information related to sending output data to one or more components of system 100 of FIG. 1 (e.g., one or more client devices HO, 112, third party server 130, etc.). In some embodiments, the output is a probability of an adverse effect or a probability of gaining or retaining a user's attention using a badge notification.

The machine learning module 315 is a hardware implemented module which manages, controls, stores, and accesses information related to building, training, updating and executing a machine learning data model, such as parameters for the dynamic Bayesian network. In some embodiments, a target member account can be input into the machine learning data model. The machine learning data model may return parameters to be used in a dynamic Bayesian network. The machine learning module 315 can implement an EM technique in determining the parameters. The machine learning data model is built and refined according to training data, which may be based on historical social network activity data; historical member account data, or profile data of one or more member accounts.

The interaction effects module 320 is a hardware-implemented module which manages, controls, stores, and accesses information related to collecting interaction effects for a set of interaction effects. In some embodiments, the interaction effects module 320 collects member account behavior (such as number of website interactions, disabling or enabling notifications, number of badge notifications presented to the user long-term, number of badge notifications presented to the user short-term, or the like). The interaction effects module 320 populates the interaction effects database 214.

The probabilities module 330 is a hardware-implemented module which manages, controls, stores, and accesses information related to calculating probabilities, such as conditional, joint, or other probabilities of the dynamic Bayesian network. A conditional probability indicates a likelihood that a second event occurs given that a first event has occurred. A joint probability indicates a likelihood of two or more events occurring. Example probability calculations performed by the probabilities module 330 can include one or more of: (1) a likelihood of gaining a user's attention (e.g., a website access) given one or more of a user's job seeking status, professional experience, previous number of badge notifications provided to the user over the short-term or long-term, age, activity level on the website (number of website accesses in a specified period of time), job title; gender; intrinsic interest in the website, affinity for being influenced into visiting the website, or the like; or (2) a likelihood of losing a user's attention (e.g., a user disabling notifications or deleting an app) given one or more of a user's job seeking status, professional experience, previous number of badge notifications provided to the user over the short-term or long-term, age, activity level on the website (number of website accesses in a specified period of time), job title, gender, intrinsic interest in the website, affinity for being influenced into visiting the website, or the like.

Some mathematical details regarding an embodiment of the DBN are provided. The mathematical framework discussed may be implemented using one or more of the notification blindness engine 206, such as the machine learning module 315 or the parameters module 330. A full likelihood function, where (represents cumulative probability distributions (CPDs) is provided as follows:

$$p(u\mid\theta) = \prod_{t=1}^{T} \sum_{(j_1,j_2,\ldots j_{N_Z})}^{|Z_1|*|Z_2|\ldots|Z_{N_Z}|} \prod_{i=1}^{N_Z} p(Z_{i,j_i}^t \mid Pa(Z_i^t), \theta) \prod_{i}^{N_X} (X_i^t \mid Pa(X_i^t), \theta)$$

$$p(U\mid\theta) = \prod_{u}^{U} p(u, \theta)$$

$$\hat{\theta} = \arg\max_{\theta} p(U\mid\theta)$$

Where the hidden variables are denoted by Z and the observed variables are denoted by X, and users are denoted by U. In the DBN model $ZI=\{It, A_t\}$ and $X_t=\{M_t, J_t, N_t, R_t, D_t, S_t\}$. Pa represents parent variables. The DBN model has parameters $\theta=(a, b)$ where a represents transition probabilities and b represents emission probabilities.

$$a(Z^t, Z^{t+1}) = \prod_{i=1}^{N_Z} p(Z_i^{t+1} \mid Pa(Z_i^{t+1}))$$

$$b(X^t) = \prod_{i=1}^{N_{X_{in}}} p(X_i^t \mid Pa_i(X^t))$$

EM is an iterative technique to update the parameters, and the general EM formulas are:

$$L(\theta, U) = p(U\mid\theta)$$

$$Q(\theta, \theta^{(r)}) = E_{Z\mid X, \theta^{(r)}} \log L(\theta, U)$$

$$\theta^{(r+1)} = \arg\max_{\theta} Q(\theta, \theta^{(r)})$$

Applying the EM formulas to the DBN model, the parameters can be updated. Some examples showing how the parameters can be calculated are provided. To update the parameter for transition probabilities between the hidden variable user intent I:

$$a_{i_I, j_I}^r = \frac{\sum_{u}^{U} \sum_{t=1}^{T-1} w(I_{t-1} = i_I, I_t = j_I)}{\sum_{u}^{U} \sum_{t=1}^{T-1} w(I_{t-1} = i_I)}$$

To update the parameter for emission probabilities from I to member activeness $$b_{i_I, j_M}^r = \frac{\sum_{u}^{U} \sum_{t=1}^{T-1} w(I_{t-1} = i_I, M_t = j_M)}{\sum_{u}^{U} \sum_{t=1}^{T-1} w(I_t = i_I)}$$

To update the parameter for transition probabilities from disable notification channel D and engaged session time S to short term notification sent N:

$$b_{i_D, j_S, k_N}^r = \frac{\sum_{u}^{U} \sum_{t=1}^{T-1} w(D_t = i_D, S_t = j_S, N_t = k_N)}{\sum_{u}^{U} \sum_{t=1}^{T-1} w(D_t = i_D, S_t = j_S)}$$

where w represents weighted occurrence that are calculated based on the counts of observations of X and estimated probabilities of Z.

The DBN can determine weighted, hidden observation patterns on the parent nodes of a node, determining the weighted hidden observation occurring patterns of both the parent and the node of interest, and then dividing to calculate p(node parent). Weighted means the pattern is multiplied by the probability of the hidden variables and the occurring patterns means all possible combinations of values of hidden and observed variables. For example, consider a hidden variable A, observed B, and local structure A→B. Weighted patterns for the parent are found, for example parent weight (A=1)=0.2 and weighted pattern of weight(A=1, B=2)=0.12, then p(B=2|A=1)=0.6.

Figure 6:
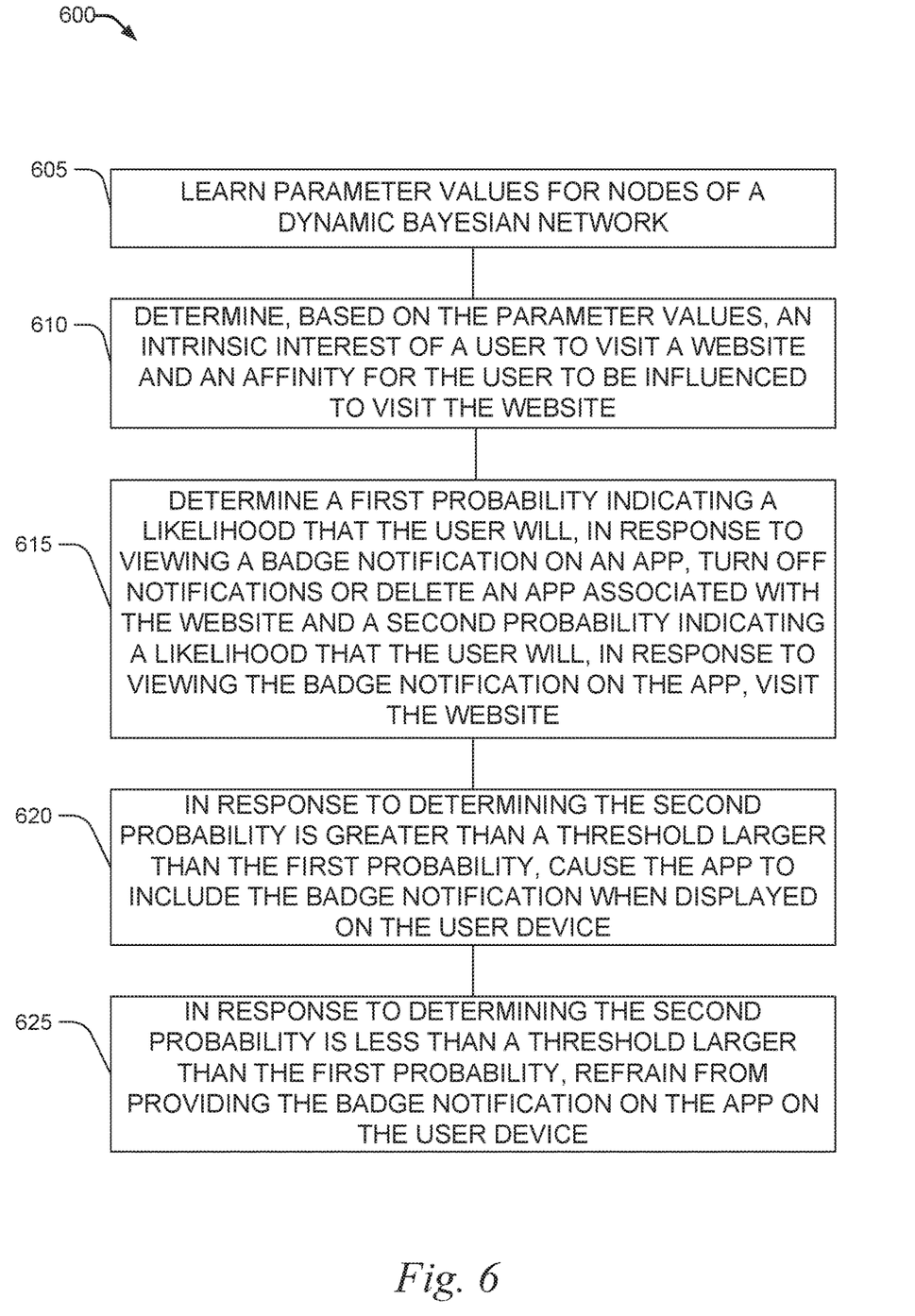
FIG. 6 is a flowchart illustrating an example method, according to various embodiments.

FIG. 6 is a flowchart illustrating an example method 600, according to various embodiments. The method 600 as illustrated includes learning parameter values for nodes of a dynamic Bayesian network, at operation 605; determining, based on the learned parameter values, an intrinsic interest of a user to visit a website and an affinity for the user to be influenced to visit the website, at operation 610; determining, such as by using the determined parameter values, learned intrinsic interest, and affinity for the user to be influenced to visit the website, a first probability indicating a likelihood that the user will, in response to viewing a badge notification on an app, turn off notifications or delete an app associated with the website and a second probability indicating a likelihood that the user will, in response to viewing the badge notification on the app, visit the website, at operation 615; in response to determining the second probability is greater than a threshold larger than the first probability, causing the app to include the badge notification when displayed on the user device, at operation 620; and in response to determining the second probability is less than a threshold larger than the first probability, refraining from providing the badge notification on the app on the user device, at operation 625.

The operation 610 can further include, wherein the affinity for the user to be influenced to visit the website is further determined based on a number of badge notifications displayed on the user device in a short-term. The number of badge notifications displayed on the user device in a short-term can be learned at operation 605. The operation 610 can further include, wherein the affinity for the user to be influenced to visit the website is further determined based on a number of badge notifications displayed on the user device in a term longer than the short-term. The number of badge notifications displayed on the user device in a term longer than the short-term can be learned at operation 605. The operation 605 can further include comparing information in a profile of the user to information in profiles of other users of the website and using a machine learning technique to determine the parameters based on information in profiles of the other users that include a same age range and gender as the user.

The operation 605 can further include learning the parameters based on information in profiles of the other users that further include a same activity level on the website. The operation 605 can further include learning the parameters based on information in profiles of the other users that further include a same job seeker status.

The method 600 can further include predicting a future activity level of the user based on the intrinsic interest of the user to visit the website, the affinity for the user to be influenced to visit the website, number of badge notifications provided to the user in the short-term, and the number of badge notifications provided to the user in the term longer than the short-term. The short-term can include an immediately previous day, and the term longer than the short-term is six weeks. The method can further include determining a probability that the user will become blind to the badge notification and refraining from providing the badge notification in response to determining the probability is greater than a threshold.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module mechanically, in dedicated and permanently configured circuitry, or in temporarily configured circuitry (e.g., configured by software) may be driven by cost and time considerations.

The term "hardware module" is a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. Another hardware module may, at a later time, access the memory device to retrieve and process the stored output. Hardware modules may initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some embodiments, the processor or processors may be located in a single location (within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product (e.g., a computer program tangibly embodied in an information carrier, such as in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server is generally remote from each other and typically interact through a communication network. The relationship of client and server arises through computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
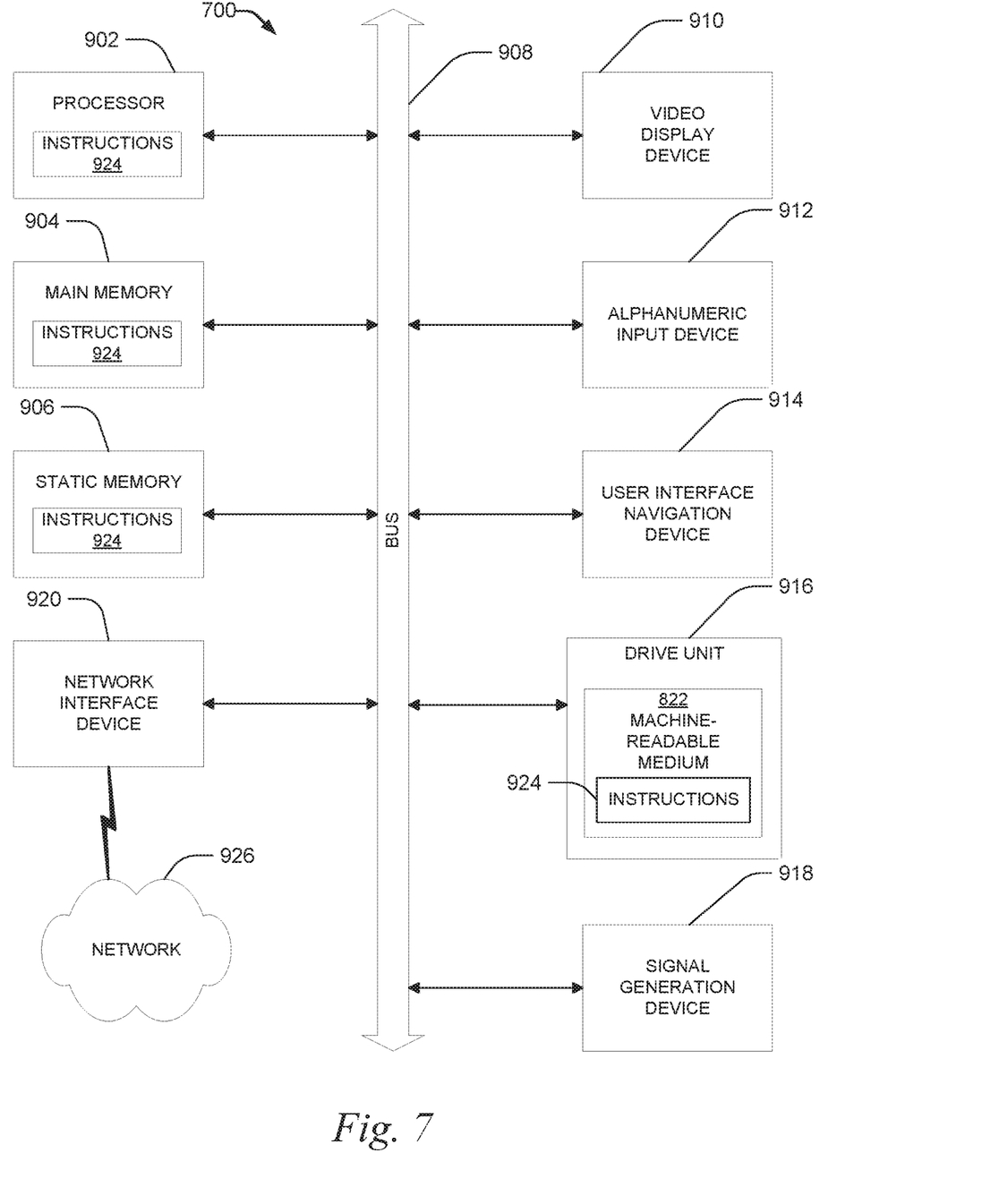
FIG. 7 is a block diagram of an example computer system on which operations, actions and methodologies described herein may be executed, in accordance with an example embodiment.

FIG. 7 is a block diagram of an example computer system 700 on which operations, actions and methodologies described herein may be executed, in accordance with an example embodiment. One or more components of the notification blindness engine 206, front end 201, or application logic layer 203, the system 200, or the like, may include one or more components of the computer system 700. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 902 (e.g., a central processing unit (CPU), a graphics processing unit (GPU) or both), a main memory 904, and a static memory 906, which communicate with each other via a bus 908. Computer system 700 may further include a video display device 910 (e.g., a liquid crystal display (LCD) or a cathode ray tube (CRT)). Computer system 700 also includes an alphanumeric input device 912 (e.g., a keyboard), a user interface (UI) navigation device 914 (e.g., a mouse or touch sensitive display), a disk drive unit 916, a signal generation device 918 (e.g., a speaker) and a network interface device 920.

Disk drive unit 916 includes a machine-readable medium 822 on which is stored one or more sets of instructions and data structures (e.g., software) 924 embodying or utilized by any one or more of the methodologies or functions described herein. Instructions 924 may also reside, completely or at least partially, within main memory 904, within static memory 906, and/or within processor 902 during execution thereof by computer system 700, main memory 904 and processor 902 also constituting machine-readable media.

While machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" includes any tangible medium that may store, encode, or carry instructions for execution by the machine and that cause the machine to perform any one or more of the methodologies of the present technology, or that may store, encode, or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 924 may further be transmitted or received over a communications network 926 using a transmission medium. Instructions 924 may be transmitted using network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that may store, encode, or carry instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation; specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
   a processor;
   a memory device holding an instruction set executable on the processor to cause the computer system to perform operations comprising:

learning, using an iterative expectation maximization (EM) machine learning (ML) technique, parameter values for current intrinsic interest and affinity to be influenced nodes of a dynamic Bayesian network, the dynamic Bayesian network including the affinity to be influenced node as a child node of the intrinsic interest node, a job seeker status node, a member activeness level node, and short and long-term notifications nodes, and the intrinsic interest node a child of the job seeker status node and the member activeness level node;

determining, based on (i) the learned parameter values and (ii) an activity level of a user on a website, an intrinsic interest of the user to visit the website;

determining, at the affinity to be influenced node and based on probability distributions of the intrinsic interest node, the job seeker status node, the member activeness level node, and the short and long-term notifications nodes, an affinity for the user to be influenced to visit the website;

determining, using the learned parameter values, learned intrinsic interest, and determined affinity for the user to be influenced to visit the website, a first probability indicating a likelihood that the user will, in response to viewing a badge notification on an app, turn off notifications or delete an app associated with the website and a second probability indicating a likelihood that the user will, in response to viewing the badge notification on the app, visit the website; and in response to determining the second probability is greater than the first probability, causing the app to include the badge notification when displayed on the user device or in response to determining the second probability is less than the first probability, refraining from providing the badge notification on the app on the user device.

2. The computer system of claim 1, wherein learning the parameter values includes comparing information in a profile of the user to information in profiles of other users of the website and using a machine learning technique to determine the parameters based on information in profiles of the other users that include a same age range and gender as the user.

3. The computer system of claim 2, wherein the parameters are determined based on information in profiles of the other users that further include a same activity level on the website.

4. The computer system of claim 3, wherein the parameters are further determined based on information in profiles of the other users that further include a same job seeker status.

5. The computer system of claim 1, wherein the operations further comprise predicting a future activity level of the user based on the intrinsic interest of the user to visit the website, the affinity for the user to be influenced to visit the website, number of badge notifications provided to the user in the short-term, and the number of badge notifications provided to the user in the term longer than the short-term.

6. The computer system of claim 5, wherein short-term is an immediately previous day, and the term longer than the short-term is six weeks.

7. A method comprising:

learning, using an iterative expectation maximization (EM) machine learning (ML) technique, parameter values for current intrinsic interest and affinity to be influenced nodes of a dynamic Bayesian network, the dynamic Bayesian network including the affinity to be influenced node as a child node of the intrinsic interest node, a job seeker status node, a member activeness level node, and short and long-term notifications nodes, and the intrinsic interest node a child of the job seeker status node and the member activeness level node;

determining, based on (i) the learned parameter values, (ii) a value from the member activeness level node, and (iii) a value from the job seeker status node, an intrinsic interest of a user to visit a website;

determining, at the affinity to be influenced node and based on probability distributions of the intrinsic interest node, the job seeker status node, the member activeness level node, and the short and long-term notifications nodes, an affinity for the user to be influenced to visit the website;

determining, using the learned parameter values, determined intrinsic interest, and determined affinity for the user to be influenced to visit the website, a first probability indicating a likelihood that the user will, in response to viewing a badge notification on an app, turn off notifications or delete an app associated with the website and a second probability indicating a likelihood that the user will, in response to viewing the badge notification on the app, visit the website; and in response to determining the second probability is greater than the first probability, causing the app to include the badge notification when displayed on the user device or in response to determining the second probability is less than the first probability, refraining from providing the badge notification on the app on the user device.

8. The method of claim 7, wherein learning the parameter values includes comparing information in a profile of the user to information in profiles of other users of the website and using a machine learning technique to determine the parameters based on information in profiles of the other users that include a same age range and gender as the user.

9. The method of claim 8, wherein the parameters are determined based on information in profiles of the other users that further include a same activity level on the website.

10. The method of claim 9, wherein the parameters are further determined based on information in profiles of the other users that further include a same job seeker status.

11. A non-transitory machine-readable storage medium embodying instructions that, when executed by one or more processors, cause the one or more processors to perform operations comprising learning, using an iterative expectation maximization (EM) machine learning (ML) technique, parameter values for current intrinsic interest and affinity to be influenced nodes of a dynamic Bayesian network, the dynamic Bayesian network including the affinity to be influenced node as a child node of the intrinsic interest node, a job seeker status node, a member activeness level node, and short and long-term notifications nodes, and the intrinsic interest node a child of the job seeker status node and the member activeness level node;

determining, based on (i) the learned parameter values, (ii) a value from the member activeness level node, and (iii) a value from the job seeker status node, an intrinsic interest of a user to visit a website;

determining, at the affinity to be influenced node and based on probability distributions of the intrinsic interest node, the job seeker status node, the member activeness level node, and the short and long-term notifications nodes, an affinity for the user to be influenced to visit the website;

determining, using the learned parameter values, determined intrinsic interest, and determined affinity for the user to be influenced to visit the website, a first probability indicating a likelihood that the user will, in response to viewing a badge notification on an app, turn off notifications or delete an app associated with the website and a second probability indicating a likelihood that the user will, in response to viewing the badge notification on the app, visit the website; and in response to determining the second probability is greater than the first probability, causing the app to include the badge notification when displayed on the user device or in response to determining the second probability is less than the first probability, refraining from providing the badge notification on the app on the user device.

12. The non-transitory machine-readable storage medium of claim 11, wherein the operations further comprise predicting a future activity level of the user based on the intrinsic interest of the user to visit the website, the affinity for the user to be influenced to visit the website, number of badge notifications provided to the user in the short-term, and the number of badge notifications provided to the user in the term longer than the short-term.

13. The non-transitory machine-readable storage medium of claim 12, wherein short-term is an immediately previous day, and the term longer than the short-term is six weeks.

* * * * *

UNITED STATES PATENT AND TRADEMARK OFFICE
CERTIFICATE OF CORRECTION

PATENT NO. : 10,853,736 B2
APPLICATION NO. : 15/816304
DATED : December 1, 2020
INVENTOR(S) : Yan et al.

Page 1 of 1

It is certified that error appears in the above-identified patent and that said Letters Patent is hereby corrected as shown below:

In the Claims

In Column 19, Line 20, in Claim 1, delete "learned" and insert --determined-- therefor Signed and Sealed this
Second Day of March, 2021

Drew Hirshfeld
*Performing the Functions and Duties of the
Under Secretary of Commerce for Intellectual Property and
Director of the United States Patent and Trademark Office*